United States Patent
Sheehan et al.

(10) Patent No.: US 7,158,856 B2
(45) Date of Patent: Jan. 2, 2007

(54) APPARATUS FOR ENABLING PART PICKING IN A MANUFACTURING FACILITY

(75) Inventors: Niall Sheehan, Limerick (IE); Matthew Griffiths, Berkshire (GB); Terence Madden, Limerick (IE)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 10/968,593

(22) Filed: Oct. 19, 2004

(65) Prior Publication Data

US 2006/0058915 A1 Mar. 16, 2006

(30) Foreign Application Priority Data

Aug. 31, 2004 (IE) .................................. 2004/0579

(51) Int. Cl.
*G06F 7/00* (2006.01)

(52) U.S. Cl. .................. 700/216; 700/214; 700/225; 700/226; 700/229; 700/230; 340/517; 340/518; 340/524; 340/525

(58) Field of Classification Search ............... 700/213, 700/214, 216, 228, 229, 230; 340/517, 518, 340/524, 525, 7.51, 7.55, 7.56, 7.2, 7.27, 340/568.1
See application file for complete search history.

(56) References Cited

U.S. PATENT DOCUMENTS

| | | | |
|---|---|---|---|
| 3,988,983 A | 11/1976 | Matsumoto et al. ........... 101/35 |
| 4,408,122 A | 10/1983 | Casden ........................ 235/449 |
| 4,636,634 A | 1/1987 | Harper et al. ................ 250/223 |
| 4,821,197 A * | 4/1989 | Kenik et al. ................. 700/106 |
| 5,528,825 A | 6/1996 | Miyauchi et al. ............. 29/837 |
| 5,539,976 A | 7/1996 | Miyauchi et al. ............. 29/740 |
| 5,646,616 A * | 7/1997 | Komatsu ...................... 340/988 |
| 5,875,434 A * | 2/1999 | Matsuoka et al. ............. 705/28 |
| 5,877,962 A * | 3/1999 | Radcliffe ..................... 700/215 |
| 6,076,023 A * | 6/2000 | Sato ............................ 700/214 |
| 6,435,405 B1 | 8/2002 | Albinger et al. ............. 235/375 |
| 6,650,225 B1 * | 11/2003 | Bastian et al. .............. 340/5.92 |
| 6,684,039 B1 | 1/2004 | Wazana et al. .............. 399/109 |
| 6,775,588 B1 * | 8/2004 | Peck ........................... 700/214 |
| 6,873,881 B1 * | 3/2005 | Schneible, Sr. .............. 700/216 |
| 6,878,896 B1 * | 4/2005 | Braginsky et al. ........... 209/583 |
| 2002/0103569 A1* | 8/2002 | Mazur ......................... 700/216 |
| 2003/0233165 A1* | 12/2003 | Hein et al. ................... 700/216 |

(Continued)

FOREIGN PATENT DOCUMENTS

EP 0732 278 A1 3/1996

*Primary Examiner*—Khoi H. Tran
(74) *Attorney, Agent, or Firm*—Hamilton & Terrile, LLP; Stephen A. Terrile

(57) ABSTRACT

An apparatus for enabling part picking in a manufacturing facility comprises a conveyor 30 for transporting containers each bearing a barcode defining a plurality of parts to be placed in the container and, disposed at intervals along the conveyor, a plurality of barcode readers 26, a plurality of part storage racks 34, and a plurality of display screens 36. A control system 44, 46, 48 can selectively assign the code readers, storage racks and display screens to one or more zones each including at least one active barcode reader, at least one active display screen and at least one storage rack. In operation the control system displays on at least one display screen of each zone the parts to be picked from the at least one storage rack according to the barcode read by the at least one active scanner.

9 Claims, 1 Drawing Sheet

U.S. PATENT DOCUMENTS

2004/0207512 A1* 10/2004 Bastian ...................... 340/5.92
2004/0243278 A1* 12/2004 Leishman ................... 700/214
2005/0043850 A1* 2/2005 Stevens et al. ............. 700/213
2005/0055129 A1* 3/2005 Chien ........................ 700/216

* cited by examiner

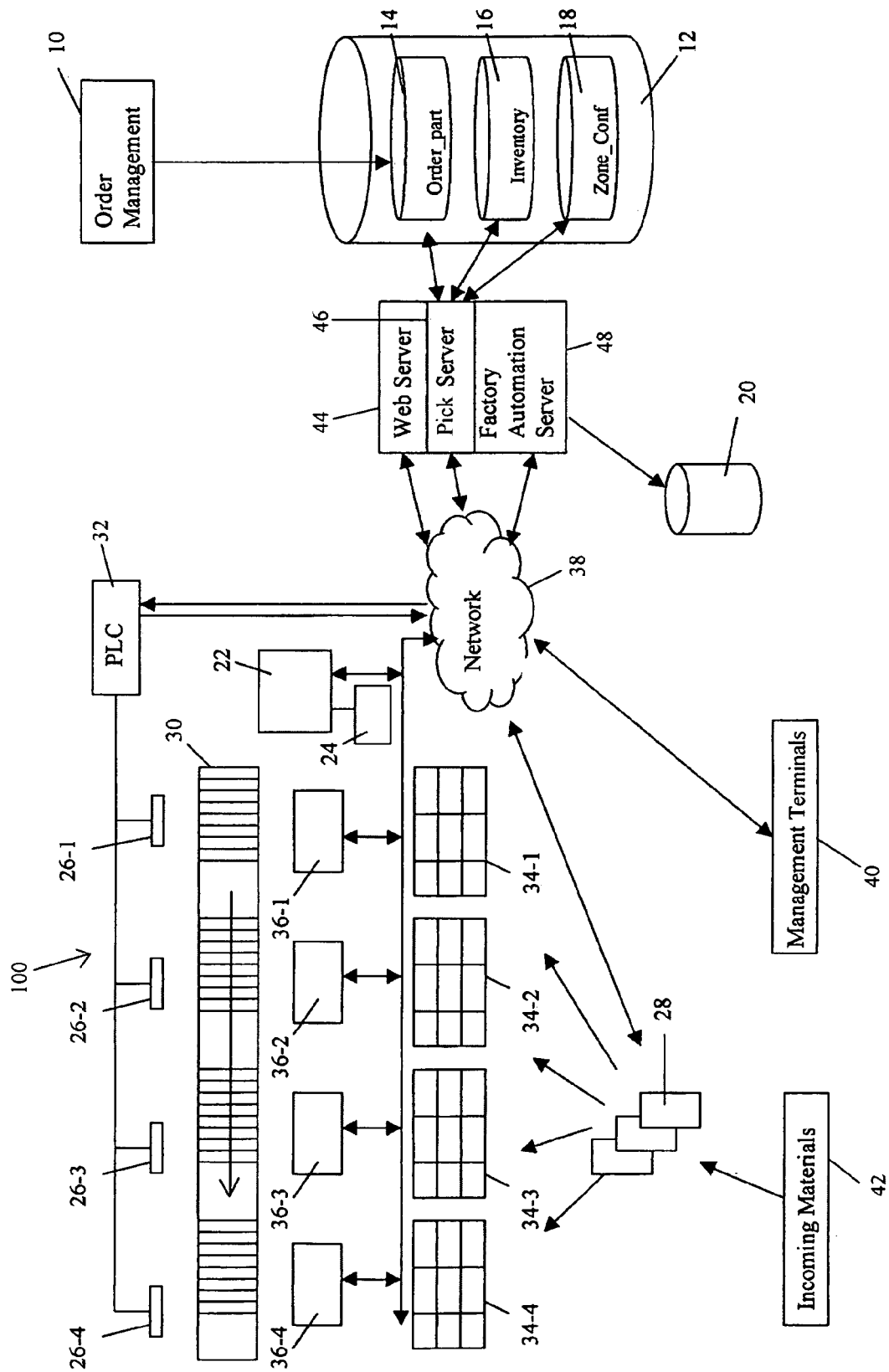

APPARATUS FOR ENABLING PART PICKING IN A MANUFACTURING FACILITY

FIELD OF THE INVENTION

This invention relates to apparatus for enabling part picking in a manufacturing facility, in particular but not exclusively a build-to-order manufacturing facility for personal computer (PC) system units.

BACKGROUND OF THE INVENTION

In a build-to-order (BTO) manufacturing process an individual PC system unit is built to a customer's specification from a range of available options. For instance, the target system unit might include a certain brand of hard drive, a certain brand of processor and other parts selected by the user from a menu of available options.

Prior to assembly of each system unit, the particular parts required to fulfil that order must be picked from an inventory of available parts. Conventionally, this is done by transporting an open-topped container, known as a traveller past a plurality of pick stations, the traveller bearing a barcode identifying the parts necessary to fulfil the order. Each pick station has one or more racks containing parts which might be needed for the order and at each pick station the barcode is scanned and the result passed to a control circuit to determine if, in fact, one or more parts needed for that order are stored in the associated racks. If so, the traveller is halted and the control circuit causes lights to be lit over the relevant rack locations to indicate that those parts have to be picked and placed in the traveller. When a part is picked and placed in the traveller, the operative at that pick station presses a button to turn off the light. When all parts have been picked and all lights turned off a signal is sent to the control circuit which releases the traveller to move on to the next pick station.

A disadvantage of this apparatus is that the control circuit is "hard wired" to the scanners, so that if an operative is missing or absent the conveyor has to be halted while another operative is found to take his/her place. A further disadvantage is the slow speed at which parts can be re-located from one zone to another It is therefore an object of the invention to provide an improved apparatus for enabling part picking in a manufacturing facility in which this disadvantage is avoided or mitigated.

SUMMARY OF THE INVENTION

Accordingly, the present invention provides an apparatus for enabling part picking in a manufacturing facility, the apparatus comprising: a conveyor for transporting containers each bearing a machine readable code defining a plurality of parts to be placed in the container; a plurality of code readers disposed at intervals along the conveyor, each of the plurality of code readers being capable of reading the codes borne by the containers; a plurality of part stores for containing parts to be placed in the containers; a plurality of displays; and, a control system for selectively assigning the code readers, part stores and displays to one or more zones each including at least one active code reader, at least one active display and at least one part store, the control system in operation further displaying on at least one active display of each zone the parts to be picked from the at least one part store of the zone according to the machine readable code read by the at least one active code reader of the zone.

The advantages of the invention are that it provides a flexible picking system in which different zones can be configured containing different combinations of scanner, displays and part stores according to the availability of operators.

BRIEF DESCRIPTION OF THE DRAWINGS

An embodiment of the invention will now be described, by way of example, with reference to the accompanying drawing which is a schematic diagram of a system according to an embodiment of the invention.

DETAILED DESCRIPTION OF THE EMBODIMENT OF THE INVENTION

The drawing shows a portion of the assembly line, and related control software, for the manufacture of BTO PC system units, in particular the portion where the parts are picked for each order, prior to their assembly. This portion of the assembly line is referred to herein as the picking system.

The picking system comprises a plurality of picking lines 100, of which only one is shown in the drawing. Each picking line comprises a conveyor 30, which moves from right to left in the drawing, and a plurality of pick stations disposed along the conveyor. Each pick station comprises a respective barcode scanner 26, a respective parts rack (which expression is intended to cover a set of parts racks) 34, and a respective computer terminal 36 including a display monitor or other display device (the reference 36 is used interchangeably for the terminal and its monitor, according to context). Although only four pick stations are shown in the drawing, identified by the suffixes -1, -2, -3 and -4 respectively, in practice there will be more than four such stations disposed along the conveyor 30. Each rack 34 contains parts of one or more type which can be picked manually by a human operator according to a list displayed on one of the monitors 36, normally but not necessarily the monitor at the same pick station as the rack. The scanners 26 in each line are connected to a programmed logic controller (PLC) 32 which is common to all the picking lines.

The picking system also includes various servers 10, 44, 46 and 48, various databases 14, 16 and 18, and management terminals 40. These collectively constitute a control system which enables the initial setup and controls the subsequent real time operation of the picking system. These servers, databases and terminals communicate with each other and with the picking lines 100 via an intranet 38, and their functions are best described in association with a description of the overall operation of the system, which now follows.

On each line 100 the pick stations are configurable into different pick zones by management computer terminals 40. A pick zone includes at least one terminal 36, at least one scanner 26 and at least one rack 34. In a default situation each pick zone corresponds to a respective pick station, consisting of a scanner 26 with its associated rack 34 and terminal 36, but this is not necessary and the management terminals 40 can, under operator control, selectively assign multiple racks 34, multiple terminals 36 and/or multiple scanners 26 to a single zone. In such a case those terminals and/or scanners, if any, not currently assigned to a zone are rendered inactive by the system. The current zone configuration of each line, i.e. the particular terminal, scanner(s) and rack(s) assigned to each zone, are stored in a Zone_Conf database 18 of a relational database 12. The configuration of the line 100 into zones is usually done once at the start of a shift, but it can be done at any time when the conveyor 30 is halted and all orders sent to that line have been picked. The particular zone configuration selected at any given time will depend on the number of operatives available to man the line, the nature of product orders to be fulfilled and the number and distribution of product parts in the racks 34.

In operation of the picking system, an order management server 10 receives individual orders from the manufacturer's web-site or call centre, each order defining a system unit containing a particular combination of parts as selected by the intended purchaser. The order is given an order identifier (Order ID) and passed to the relational database 12 where it is stored in an Order_Part database 14. The Order_Part database 14 associates the Order ID with the parts required to complete that order.

When the parts for an order are to be picked, the Order ID is read from the database 14 by the pick server 46 which determines if all the parts required to complete the order are contained within the racks of a single picking line 100, and in particular within the racks assigned to the currently defined zones for that line. This determination is made by reading an Inventory database 16 which lists which parts are in which racks in which picking lines. The Inventory database 16 is continually updated as parts are picked, as will be described). If there is insufficient inventory to complete the order, the shortage is recorded in a shortage Report for replenishment operators to correct—this described later.

If there is sufficient inventory in a particular line 100, the Order ID is sent to a PC 22 located near the first pick station of the line. Each order is queued to a printer 24 attached to the PC 22 which prints the Order ID as a barcode onto a respective adhesive label. The label is manually attached to a respective traveller which is then placed in a predetermined orientation on the conveyor 30 for transport successively past the scanners 26-1, 26-2, etc, so that the barcode can be read by the scanners. Each time a traveller moves out of the first pick station a new barcode label is printed, relating to the next order in the queue, which is attached to a new traveller and the latter placed on the conveyor 30.

As each traveller moves along the conveyor 30 it passes through successive zones and its barcode is scanned by the active scanners of those zones. Assuming for the moment that there is only one active scanner and one active terminal 36 per zone, each active scanner 26 reads the barcode and feeds the barcode information to the PLC 32, where it is stored in memory, along with a line identifier (Line ID) identifying the particular line and a scanner identifier (Scanner ID) identifying the particular scanner. The Scanner ID is unique to the line but not unique across all lines; hence the Line ID and Scanner ID together define a unique scanner and thus a unique zone. The scanned barcode triggers a barcode change event to the factory automation server 48 indicating the Scanner ID. The factory automation server is so-called because it controls a wide variety of functions within the manufacturing plant—only those relevant to the present embodiment are described.

On receipt of the barcode change event, the factory automation server looks up its local configuration file 20 which tells it what information it should obtain from the memory location associated with the Scanner ID on the PLC 32. In this case, the factory automation server 48 reads the Line and Scanner IDs (which define the relevant zone) and Order ID from the PLC. The factory automation server 48 then creates an XML message containing the Order, Line and Scanner IDs. The XML message also contains some empty XML elements, for the pick server 46 to place reply values in.

The pick server 46 is continually waiting on messages from the factory automation server 48. On receipt of an XML message, the pick server looks up the Order_Part database 14, the Inventory database 16 and the Zone_Conf database 18 to determine if any of the parts required for the present order are located in the rack(s) associated with the current zone, defined by the Line and Scanner IDs.

Where a response from the pick server 46 cannot be guaranteed to return within a pre-determined period, the PLC 32 responds to scanning a barcode by stopping the portion of the conveyor associated with the scanner until a "continue" command is received from the factory automation server 48. Thus the traveller is halted adjacent to the relevant scanner 36. Alternatively or additionally the traveller may be halted by a hardware device such as a drop gate placed in front of the traveller.

If no parts for the present order are located in the rack(s) associated with the current zone, the pick server 46 returns a "continue" command to the PLC 32 via the factory automation server 48 in the empty XML elements of the received message. The PLC then actuates the relevant portion of the conveyor to cause the traveller to move out of the zone, without any picking information being displayed on an associated monitor 36 of the zone.

However, if there are parts relating to the order located in the rack(s) of the current zone, the pick server 46 checks the Zone_Conf database 18 to determine which active terminal 36 is associated with the zone. The pick server 46 then forwards an event message (including a URL) to the terminal so determined to remotely invoke a client web browser on the terminal. The client browser interprets this message and invokes a remote call to the web server 44, calling the URL specified in the message. In one embodiment the URL contains all the information required for the web server 44 to construct an HTML page indicating to an operator the number and type of parts to pick from rack(s) associated with the zone and to put them in the traveller. In another embodiment, the URL includes an identifier enabling the web server 44 to locate (in the database 12) the information relating to the number and type of parts to pick from rack(s) and to generate the required HTML page.

The HTML page is returned to the client browser and displayed on the terminal 36. Thus the monitor of the terminal 36 associated with the zone displays a page which lists for the operator working in the zone which part(s) to place in the traveller. As each part is picked and placed in the traveller a corresponding touch screen button associated on the monitor with that listed part is selected (touched) by the operator, which signals to the pick server 46 that the part has been picked.

The fact that the operator has finished placing the listed parts in the traveller can be derived automatically when all the individual parts buttons have been touched. Thus, in a preferred embodiment, the HTML page automatically provides a "continue" message in a HTTP request to the server once all the parts have been confirmed as picked.

Alternatively, the HTML page could include a "continue" touch screen button, so that the operator can signal that he or she has finished placing the listed parts in the traveller. This generates an HTTP request to the web server 44, which responds by sending a "wait" HTML page to the client browser, and signals to the pick server 46 that the listed parts have been picked.

The pick server 46 returns a "continue" message to the PLC 32 via the factory automation server 48 in the empty XML elements of the originally received message. The pick server 46 also updates the Inventory database 16 according to the touch screen confirmations received from the terminal 36. Upon receipt of the "continue" message the PLC 32 releases the traveller which continues on along the conveyor 30 to the next active scanner, or to the end of the line.

It will also be seen that the pick server 46 does not always require a first available part to be picked. If the pick server detects from the information in the database 12 that a zone further along the picking line has the same part available as the present zone, and that by using this later pick the line would be better balanced in terms of picks per zone, then the pick server can correspondingly adjust the pick list.

An operator also has the option to allow the traveller to continue to the next zone although some part has not been added to the traveller. To this end, the HTML supplied by the web server 44 includes a button enabling the operator to confirm a choice "part short". This is advantageous when there has been some inventory discrepancy in the number of parts physically available. Once the traveller, which is missing part(s) due to a short pick, reaches a pre-configured point on the line, it is automatically diverted into a reconciliation area where the missing part can be corrected.

In an alternative embodiment, where a response from the pick server to the PLC (via the ACF) can be guaranteed to occur within a pre-determined period, the portion of the conveyor associated with an active scanner can keep moving after a barcode has been scanned. If there are parts relating to the order located in rack(s) of the relevant zone, the pick server returns a "stop" message to the PLC 32 via the factory automation server 48 in the empty XML elements of the received message. Otherwise, the portion of the conveyor keeps moving and the traveller does not stop at that scanner.

In another embodiment, each terminal 36 is equipped with its own parts scanner. In such embodiment individual part barcodes are scanned as they are placed into the traveller, rather than using a touch screen confirmation. In this case the pick server 46 parses the barcode and compares it with the list of required parts for the order, confirming it as normal if the part is required. It also enables specific parts to be tracked to specific orders for future quality control.

In general, the factory automation server 48 is continually awaiting a response from the pick server 46 and when it receives a returned XML message it unpacks it. It checks in its local configuration file 20 to find the associated PLC memory location and stores the response, "continue" or "stop" or "divert", as the case may be, at the PLC memory location. This triggers the PLC to carry out this action, possibly using a hardware device such as a drop gate or diverting arm.

The foregoing has assumed that each defined zone has only one active scanner 26 and one active terminal 36. This is not necessary. For example, especially if the Zone_Conf database 18 includes data which associates each terminal 36 with its physically nearest rack 34, the system could define a zones having two or more active scanners and one active terminal, or a zone having one active scanner and two or more active terminals.

In the former case the pick server 46 would be programmed to stop the traveller at each active scanner 26 to identify if any parts are to be picked from the associated physically nearest rack 34. However, in each case the respective pick list would be displayed on the monitor of the one active terminal 36. Thus a single operator would be responsible for picking the parts from each of the racks 34, receiving the information on which parts to pick from the one monitor.

In the latter case the pick server 46 would be programmed to stop the traveller at the active scanner 26 to identify if any parts are to be picked from the any of the racks 34 associated with the zone, but the respective pick list would be displayed on the monitor 36 nearest the relevant rack. Thus a single operator would be responsible for picking the parts from each of the racks 34, receiving the information on which parts to pick from the respective monitors.

Finally, the system need not define zones all of the same type. Zones of the different types as described above can be defined to co-exist along the same picking line. In all cases the system will only stop travellers and display picks at active scanners—all inactive scanners, i.e. those not assigned to a zone, are ignored.

This flexibility is extremely beneficial when operating a manufacturing facility as if one of the operators doesn't show up for work, two or more pick stations can be "merged" to create a zone which can be comfortably operated by one operator. Alternately if one zone has a period of low running parts then zones can be combined to increase operator utilisation.

Replenishment operators replace the parts in the racks 34. They use wireless PDAs 28 which use shortage and discrepancy reports to identify which parts are required on the racks in the zones. This information is updated to the PDAs 28 every 30 secs. The replenishment operator obtains the required parts from the incoming materials 42. The operator scans the barcode of the incoming material, and obtain the rack locations for the parts via the pick server 46. If the part does not have a previous rack location, the pick server suggests an optimal location. The replenishment operator then updates the Inventory database 16.

The invention is not limited to the embodiments described herein which may be modified or varied without departing from the scope of the invention.

The invention claimed is:

1. An apparatus for enabling part picking in a manufacturing facility, the apparatus comprising:

a conveyor for transporting containers each bearing a machine readable code defining a plurality of parts to be placed in the container;

a plurality of code readers disposed at intervals along the conveyor, each of the plurality of code readers being capable of reading the codes borne by the containers;

a plurality of part stores for containing parts to be placed in the containers;

a plurality of displays, at least one of the plurality of displays being a component of a client computing device, the client computing device containing a web browser; and, a control system for selectively assigning the code readers, part stores and displays to one or more zones each including at least one active code reader, at least one active display and at least one part store, the control system in operation further displaying on at least one active display of each zone the parts to be picked from the at least one part store of the zone according to the machine readable code read by the at least one active code reader of the zone, the control system including a server which is responsive to an active code reader reading a code borne by a container to send to the client device information to be displayed indicating part(s) to be picked, the control system including a web server, the control system being responsive to an active code reader reading a code borne by a container to send a URL to the client device causing the browser to connect to the URL, the URL defining said information indicating part(s) to be picked and the web server constructing an HTML page containing said information and sending the HTML page to the client device for display.

2. The apparatus as claimed in claim 1, wherein the control system can selectively define a zone having two or more active code readers and one active display, the parts to be picked being derived from the two or more active code readers and displayed on the one active display.

3. The apparatus as claimed in claim 1, wherein the control system can selectively define a zone having one active code reader and two or more active displays, the parts to be picked being derived from the one active code reader and displayed on the two or more active displays.

4. The apparatus as claimed in claim 1, wherein the control system can selectively define a zone having one active code reader and one active display, the parts to be picked being derived from the one active code reader and displayed on the one active display.

5. The apparatus as claimed in claim 1, wherein the code readers, part stores and displays are disposed along the conveyor to define a plurality of pick stations each comprising a code reader, a part store and a display.

6. The apparatus as claimed in claim 1, wherein the control system is responsive to an active code reader reading a code borne by a container to halt the container at least if the corresponding zone has part(s) to be picked, and is responsive to a message received from an operator indicating that all parts in the corresponding zone have been picked to release the container.

7. The apparatus as claimed in claim 1, wherein the HTML page includes a respective button associated with each part indicated on the display, the button being selectable by an operator to causes the client device to signal to the web server indicating that the corresponding part has been picked.

8. The apparatus as claimed in 1, wherein the client device includes a code reader for reading codes borne by parts in the parts store, the browser being responsive to a part code being read to signal to the web server indicating that the corresponding part has been picked.

9. A control system for use with an apparatus comprising a conveyor for transporting containers each bearing a machine readable code defining a plurality of parts to be placed in the container and, disposed at intervals along the conveyor, a plurality of code readers each capable of reading the codes borne by the containers, a plurality of part stores for containing parts to be placed in the containers, and a plurality of displays, the control system comprising:

a web server;

a module to selectively assign the code readers, part stores and displays to one or more zones each including at least one active code reader, at least one active display and at least one part store; and, a module for displaying on at least one active display of each zone the parts to be picked from the at least one part store of the zone according to the machine readable code read by the at least one active code reader of the zone;

a module responsive to an active code reader reading a code borne by a container to send a URL to a client device causing a browser of the client device to connect to the URL, the URL defining said information indicating part(s) to be picked and the web server constructing an HTML page containing said information and sending the HTML page to the client device for display.

* * * * *